United States Patent
Cheng

(10) Patent No.: US 8,994,974 B2
(45) Date of Patent: Mar. 31, 2015

(54) PRINTER

(71) Applicant: Fei Cheng, Nagoya (JP)

(72) Inventor: Fei Cheng, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/956,908

(22) Filed: Aug. 1, 2013

(65) Prior Publication Data

US 2014/0036293 A1 Feb. 6, 2014

(30) Foreign Application Priority Data

Aug. 3, 2012 (JP) ................................. 2012-173401

(51) Int. Cl.
*G06F 15/00* (2006.01)
*G06K 15/00* (2006.01)

(52) U.S. Cl.
CPC .......... *G06K 15/4055* (2013.01); *Y02B 60/1267* (2013.01)
USPC ....................................................... 358/1.13

(58) Field of Classification Search
CPC ...................... G06K 15/4055; G06F 3/1221
USPC ........................................................ 358/1.13
See application file for complete search history.

(56) References Cited

U.S. PATENT DOCUMENTS

| | | | |
|---|---|---|---|
| 2005/0226641 A1 | 10/2005 | Ando et al. | |
| 2010/0321711 A1 | 12/2010 | Takahashi | |
| 2012/0257224 A1* | 10/2012 | Sasaki | ............................ 358/1.9 |

FOREIGN PATENT DOCUMENTS

| | | |
|---|---|---|
| JP | 5-338328 A | 12/1993 |
| JP | 8-310086 A | 11/1996 |
| JP | 10-230665 A | 9/1998 |
| JP | 2001-255968 A | 9/2001 |
| JP | 2006-222569 A | 8/2006 |
| JP | 2011-002669 A | 1/2011 |

* cited by examiner

*Primary Examiner* — Saeid Ebrahimi Dehkordy
(74) *Attorney, Agent, or Firm* — Scully, Scott, Murphy & Presser, P.C.

(57) ABSTRACT

A printer includes a print unit; a processor; and memory storing computer readable instructions that, when executed by the processor, cause the printer to: operate the printing unit in an operation mode, which is one of a power supply mode and a power saving mode, wherein power consumption in the power saving mode is less than power consumption in the power supply mode; execute a correction process to acquire a correction value; adjust printing characteristics of the print unit in accordance with the acquired correction value; and in case that a particular condition is satisfied while the correction process is performed and there is a print job to be executed in accordance with the adjusted printing characteristics after completing the correction process, change the operation mode from the power supply mode to the power saving mode after completing the correction process and executing the print job.

10 Claims, 8 Drawing Sheets

PRINT EXECUTION JOB SELECTION

THERE IS UNEXECUTED PRINT JOB. PLEASE SELECT JOB TO BE PRINTED.

| | | | |
|---|---|---|---|
| ■ | JOB 001 | User A | REGISTRATION DATE 2012/07/31 10:00:00 |
| ■ | JOB 002 | User A | REGISTRATION DATE 2012/07/31 10:01:00 |
| ☐ | JOB 003 | User B | REGISTRATION DATE 2012/07/31 10:05:00 |
| ☐ | JOB 004 | User C | REGISTRATION DATE 2012/07/31 10:12:00 | ued to form an image on a sheet; a processor; and memory
PRINTER

CROSS-REFERENCE TO RELATED APPLICATION

This application claims priority from Japanese Patent Application No. 2012-173401 filed on Aug. 3, 2012, the entire subject matter of which is incorporated herein by reference.

TECHNICAL FIELD

This disclosure relates to a printer having a power saving mode in which power consumption is suppressed. Specifically, this disclosure relates to the control of a change condition to change from a power supply mode when a power saving mode is satisfied.

BACKGROUND

In order to realize power saving, a printer changes from a power supply mode to a power saving mode in which power supply to some components is reduced relative to the power supply mode and power consumption is suppressed.

A background printer has a power saving mode or a configuration to display a message indicating that changes to a low power consumption mode is not possible when a user inputs change instructions for changing from a power supply mode to a low power consumption mode during an operation of a printer having the low power consumption mode (corresponding to the power saving mode) in which power consumption in a waiting state is suppressed.

SUMMARY

However, such printer has the following problem. That is, the printer executes a correction process to acquire a correction value for adjusting printing properties, one example of which is the misregistration of the position of the dynamic/static image, if needed. There are plural kinds of execution conditions to execute the correction process, and depending on the execution conditions, reliability of the correction value may be considerably deteriorated by executing a power saving mode. In this case, the correction process is re-performed when the printer returns to a power supply mode. Accordingly, even if the correction process is performed in the case in which there is not a printing job, for which the correction value can be promptly used, the correction process may be wasted.

Accordingly, this disclosure provides at least a technology to reduce execution of the wasted correction process in a printer having the power saving mode.

A printer of this disclosure comprises a print unit configured to form an image on a sheet; a processor; and memory storing computer readable instructions that, when executed by the processor, cause the printer to: operate the printing unit in an operation mode, which is one of a power supply mode and a power saving mode, wherein power consumption in the power saving mode is less than power consumption in the power supply mode; execute a correction process to acquire a correction value; adjust printing characteristics of the print unit in accordance with the acquired correction value; and in case that a particular condition is satisfied while the correction process is performed and there is a print job to be executed in accordance with the adjusted printing characteristics after completing the correction process, change the operation mode from the power supply mode to the power saving mode after completing the correction process and executing the print job.

The printer has the power supply mode and the power saving mode, in which the power supply states are different from each other, and if a change condition from the power supply mode to the power saving mode is met, the correction process is performed. If there is a print job to be executed after completing the correction process, the printer changes to the power saving mode after the correction process is completed and the print job is executed. The execution condition corresponds to, for example, user input of change instructions, or a case where the elapsed time since the final operation or the elapsed time since the final printing is equal to or larger than a threshold value. The correction process corresponds to, for example, misregistration correction and gamma correction.

That is, in case that the change condition from the power supply mode to the power saving mode is met when the processor is performing the correction process and there is the print job to be executed after completing the correction process, the printer completes the correction process and printing of the print job to be executed after the correction process before changing to the power saving mode. As a result, the result of correction process that is being executed when the change condition is met can be used for the printing process without waste.

According to the printer of this disclosure, it is possible to reduce the execution of the wasted correction process is realized as the printer having the power saving mode.

BRIEF DESCRIPTION OF THE DRAWINGS

The foregoing and additional features and characteristics of this disclosure will become more apparent from the following detailed descriptions considered with the reference to the accompanying drawings, wherein:

FIG. 6 is a diagram illustrating a selection screen for selecting a print execution job;

DETAILED DESCRIPTION

Hereinafter, illustrative embodiments of a printer according to this disclosure will be described in detail with reference to the accompanying drawings. This disclosure is applied to an electrophotographic color printer.

[Overall Configuration of the Printer]

Figure 1:
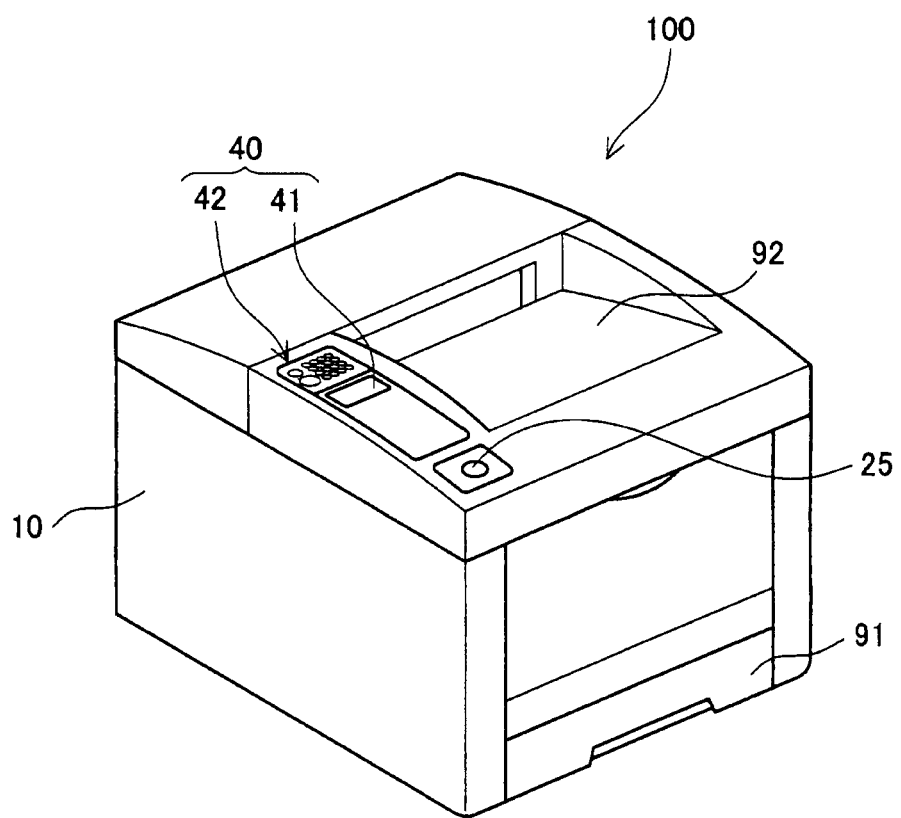
FIG. 1 is a perspective view illustrating an external appearance of a printer according to an illustrative embodiment.

As illustrated in FIG. 1, a printer 100 includes an image forming unit 10 (an example of a print unit) performing printing, a feed tray 91 accommodating sheets before printing, and a discharge tray 92 accommodating sheets after printing. Further, on an upper surface of the image forming unit 10, an operation panel 40, which includes a display unit 41 including a liquid crystal display and a button group 42 configured by an OK button, a cancel button, ten keys, and a user authentication button, is provided. By this operation panel 40, display of operation situation or user's input operation becomes possible.

Further, on the upper surface of the image forming unit 10, a power switch 25 to switch a power supply state is provided separately from the button group 42 of the operation panel 40. As modes for indicating the power supply state, the printer 100 has a power supply mode, in which power is supplied to all components, and a power saving mode, in which power supply to some components is limited to suppress power consumption. If the power switch 25 is pressed by a user, the printer 100 changes from the power supply mode to the power saving mode, or changes from the power saving mode to the power supply mode. The details of the respective modes will be described later.

[Configuration of the Image Forming Unit of the Printer]

Figure 2:
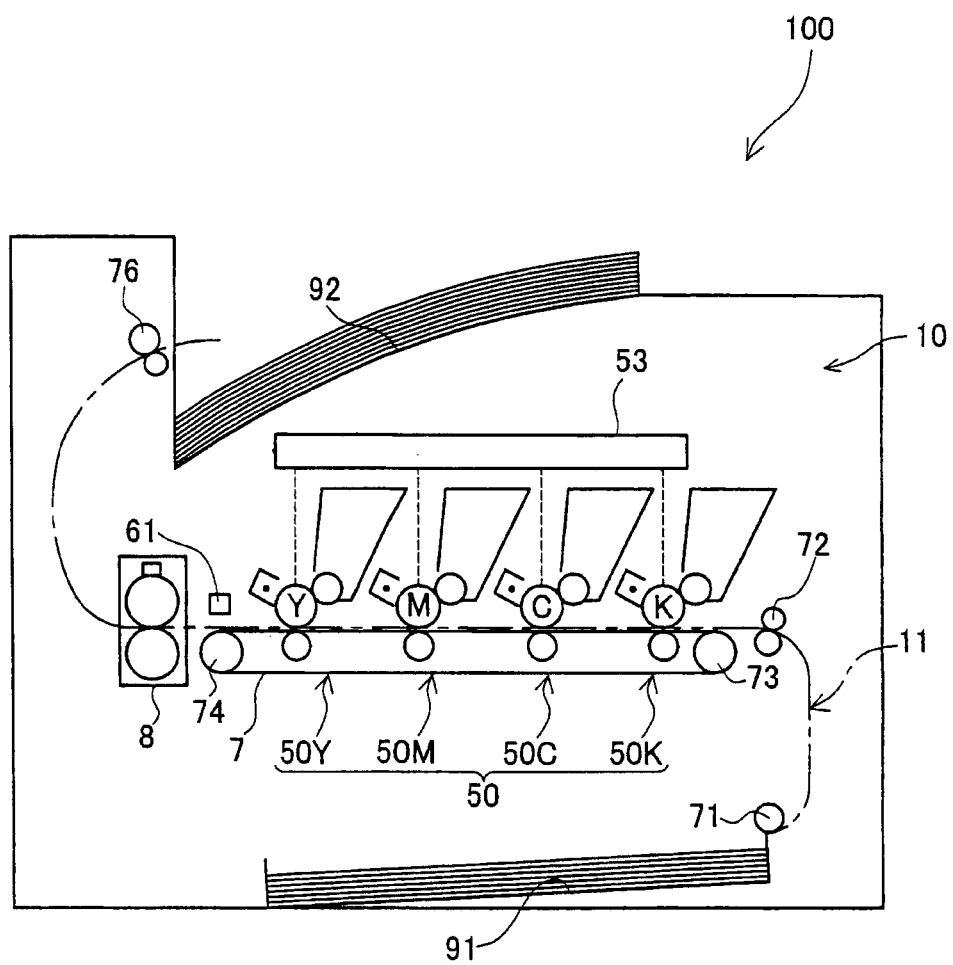
FIG. 2 is a cross-sectional view illustrating the internal configuration of the printer shown in FIG. 1.

Next, the configuration of an image forming unit 10 of a printer 100 will be described with reference to FIG. 2. The image forming unit 10 includes a processing unit 50 which forms a toner image in an electrophotographic method and transfers the toner image to a sheet, and a fixing device 8 which fixes the non-fixed toner on the sheet. Further, on the lower side of the image forming unit 10, a feed tray 91, on which a sheet before image transferring is stacked, is provided, and on the upper side of the image forming unit 10, a discharge tray 92, on which a sheet after the image transferring is stacked, is provided.

Further, the image forming unit 10 includes an exposure device 53 which irradiates respective processing units 50Y, 50M, 50C, and 50K with light, a conveyance belt 7 which conveys the sheet to a transfer position of the respective processing units 50Y, 50M, 50C, and 50K, and a mark sensor 61 which detects a pattern image that is formed on the conveyance belt 7.

Further, in the printer 100, a substantially S-shaped conveyance path 11 (a dot and dash line in FIG. 2) is provided so that the sheet, which is accommodated in the feed tray 91 that is positioned on the bottom portion thereof, passes through a feed roller 71, a resistance roller 72, the processing unit 50, and the fixing device 8, and is guided to the discharge tray 92 that is positioned on the upper portion thereof.

The processing unit 50 can form a color image, and includes processing units which correspond to respective colors of yellow (Y), magenta (M), cyan (C), and black (K), and are arranged in parallel. Specifically, the processing unit 50 includes a processing unit 50Y which forms an image of Y color, a processing unit 50M which forms an image of M color, a processing unit 50C which forms an image of C color, and a processing unit 50K which forms an image of K color. The respective processing units 50Y, 50M, 50C, and 50K are arranged to be spaced apart from each other for a predetermined distance in the conveyance direction of the sheet.

In the processing unit 50, the surface of a photosensitive conductor is uniformly charged by a charge device. Thereafter, the surface of the photosensitive conductor is exposed by light from the exposure device 53, and an electrostatic latent image of the image to be formed on the sheet is formed. Then, through a developing device, toner is supplied to the photosensitive conductor. As a result, the electrostatic latent image on the photosensitive conductor becomes a visible image as a toner image.

The conveyance belt 7 is an endless belt member that is put on conveyance rollers 73 and 74, and it is made of a resin material, such as polycarbonate. As the conveyance roller 74 is rotated, the conveyance belt 7 is circulated to the space counterclockwise direction. Accordingly, the sheet that is put on the upper surface thereof is conveyed from the side of the resistance roller 72 to the side of the fixing device 8.

The image forming unit 10 extracts the sheets put on the feed tray 91 one by one and conveys the sheets onto the conveyance belt 7. Further, the image forming unit 10 transfers the toner image, which is formed by the processing unit 50, to the sheet. As for color printing, toner images are formed by the respective processing units 50Y, 50M, 50C, and 50K, and overlap each other on the sheet. On the other hand, as for the monochrome printing, a toner image is formed only by the processing unit 590K and is transferred to the sheet. Thereafter, the sheet to which the toner image is transferred is conveyed to the fixing device 8, and the toner image is thermally fixed to the sheet. Then, the sheet after fixing is discharged to the discharge tray 92.

Further, a mark sensor 61 is positioned on the downstream side than the processing units 50Y, 50M, 50C, and 50K and on the upstream side than the fixing device in the conveyance direction of the sheet, and detects a pattern for image adjustment that is formed on the conveyance belt 7.

Figure 3:
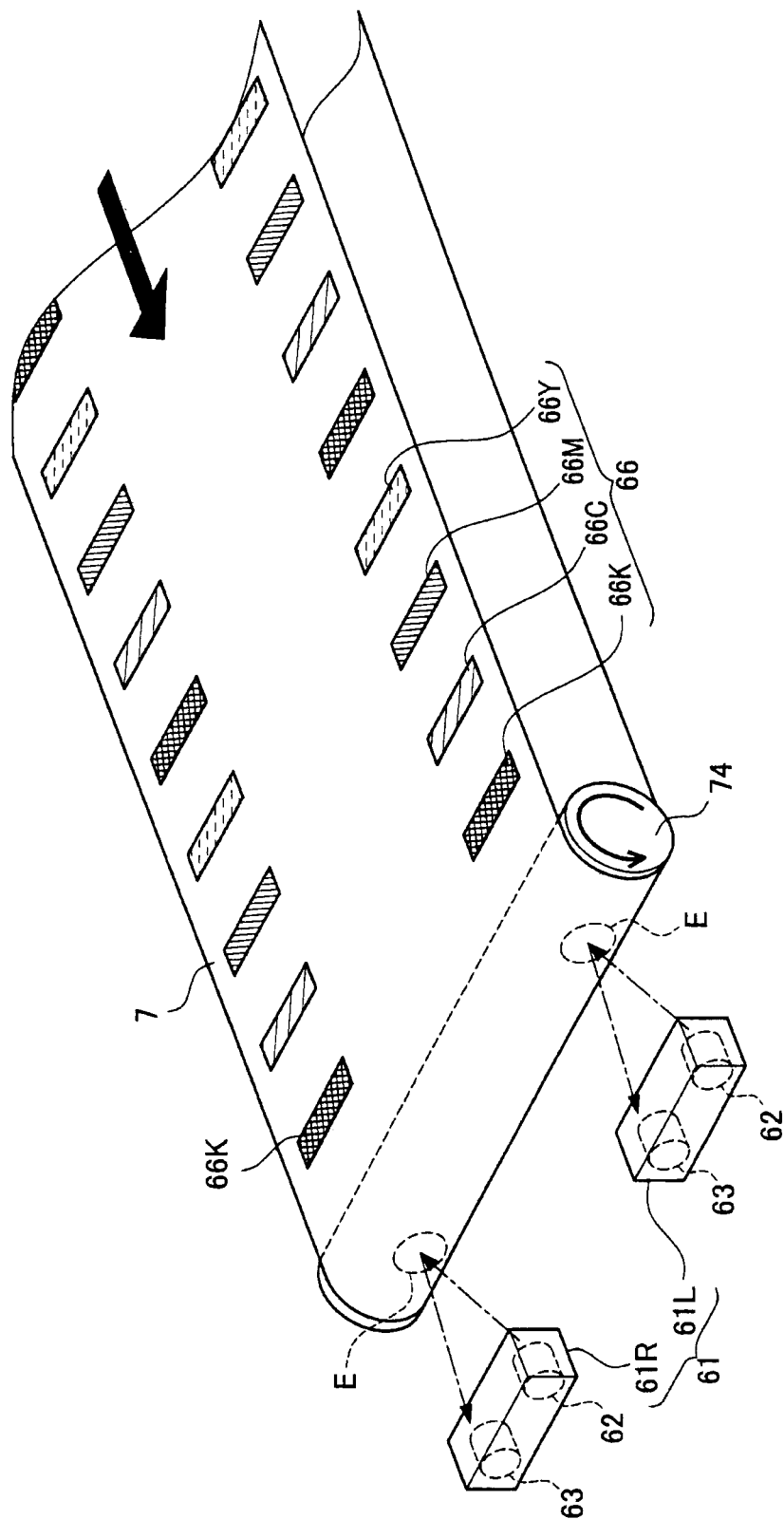
FIG. 3 is a view illustrating an arrangement of a mark sensor.
Figure 4:
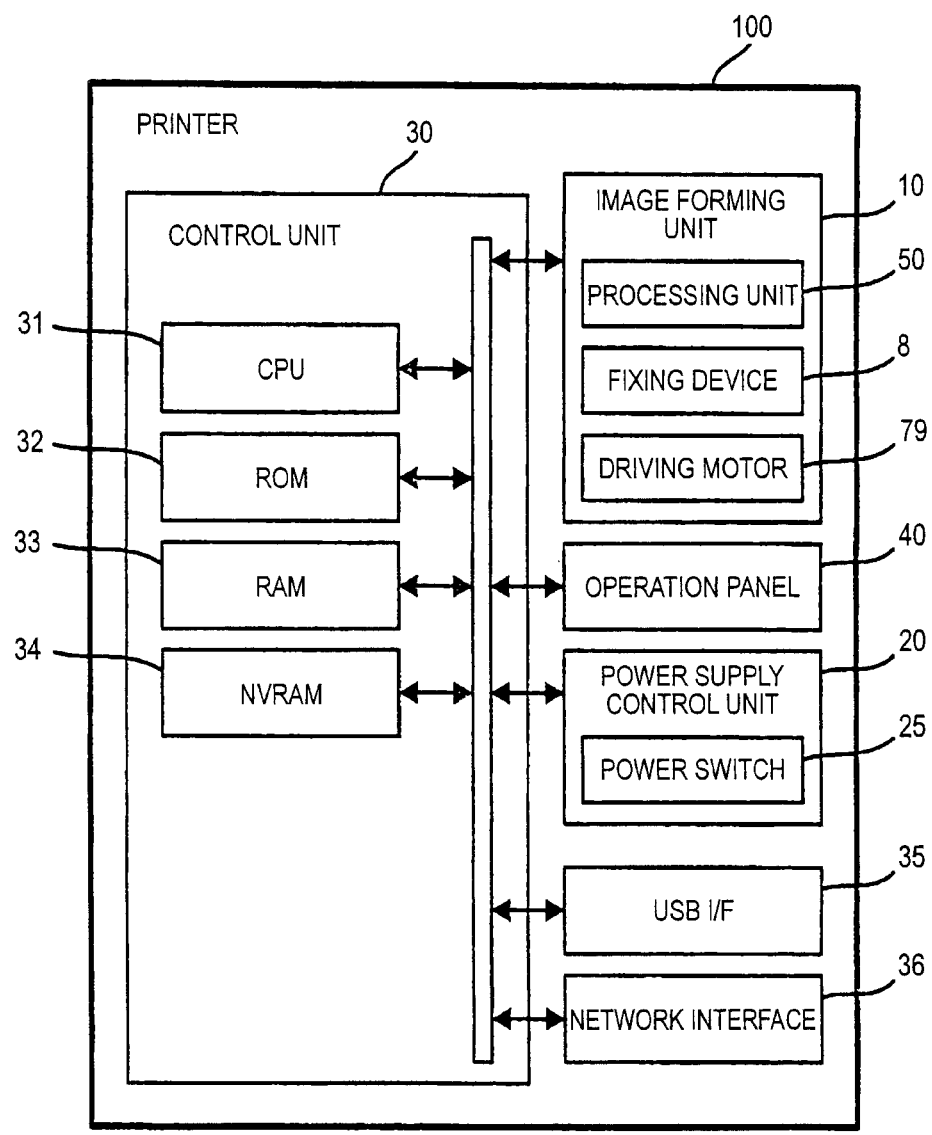
FIG. 4 is a block diagram illustrating the electrical configuration of a printer according to an illustrative embodiment.

Specifically, as illustrated in FIG. 3, the mark sensor 61 is configured by two sensors: a sensor 61R that is arranged on the right side and a sensor 61L that is arranged on the left side in the width direction of the conveyance belt 7. Each of the sensors 61R and 61L is a reflection type optical sensor in which a light emitting element 62 (e.g., LED) and a light receiving element 63 (e.g., LED) are to be a pair. The mark sensor 61 is configured so that the light emitting element 62 emits light in a slanting direction against the surface of the conveyance belt 7 (dotted frame E in FIG. 3), and the light receiving element 63 receives the light. Due to a difference between a light reception amount when the mark 66 for image adjustment (the mark 66 in FIG. 3 is an example of a mark for correcting static misregistration) passes and a light reception amount that is directly received from the conveyance belt 7, the mark for image adjustment can be detected.

[Correction Process of the Printer]

Next, various kinds of correction processes executed by the printer 100 will be described. The printer 100 executes respective correction processes, such as dynamic misregistration correction, static misregistration correction, developing bias correction, and gamma correction, in accordance with the execution conditions of the respective correction processes. On the other hand, such correction processes are exemplary. The correction processes are not limited thereto, and other correction processes may be executed.

The dynamic misregistration correction is a process for acquiring a correction value for adjusting the misregistration of the position of the dynamic image having a specific period, which is due to eccentricity of the photosensitive conductor or the conveyance rollers 73 and 74 and abnormality of the pitch of a gear that rotates them. The static misregistration correction is a process for acquiring a correction value for adjusting the misregistration of the position of the static image that does not have a specific period, which is due to the misregistration of the attachment position of the photosensitive conductor or the exposure device 53. The developing bias correction is a process for acquiring a correction value for adjusting the mismatch between an ideal density that is specified by the printer 100 and the density of the mark that is actually formed. The gamma correction is a process for correcting the mismatch between an instructed density (instructed gradation) by an external computer or an output density of the printer 100 itself. In the respective correction processes, dedicated marks are formed, and the marks are read by mark sensors 61 to acquire respective correction values.

A plurality of correction process execution conditions are provided by correction processes. Further, the correction process execution timing may differ for each execution condition. For example, in case that the execution condition is a cover open, power supply input, or user instructions, the execution timing becomes an immediate time when the execution condition is met. Further, in case that the execution condition is the print number of sheets, continuous starting time, or the change of the environment, such as temperature and humidity, in the printer, the execution timing is to be a time before printing the job being executed after the execution condition is met.

If the density of each mark has the mismatch, although the mark is a mark formed on the same image forming position, non-uniformity occurs in the read light reception amount by the mark sensor 61. Accordingly, a mismatch occurs in the mark detection position, and it becomes difficult to detect the image forming position with good accuracy. Accordingly, when the dynamic misregistration correction or the static misregistration correction is executed, the developing bias correction is executed as a set, and the developing bias correction is executed prior to the dynamic misregistration correction or the static misregistration correction.

Further, even in the gamma correction, if the density mismatch occurs in the printer 100, it becomes difficult to detect the characteristic change of the density of each color with good accuracy. Accordingly, when the gamma correction is executed, the developing bias correction is executed as a set, and the developing bias correction is executed prior to the gamma correction.

Further, if the image forming position has the dynamic misregistration, it becomes difficult to detect the static misregistration with good accuracy. Accordingly, in the case of executing the static misregistration correction, the dynamic misregistration correction is executed as a set, and the dynamic misregistration correction is executed prior to the static misregistration correction.

In consideration of a combination of the above-described corrections, in case that the respective correction processes meet the execution condition at the same time and also it is necessary to execute a plurality of correction processes in certain timing, a series of corrections in the execution timing is performed in the following priority order.
1. Developing bias correction
2. Gamma correction
3. Dynamic correction process
4. Static correction process.

[Electrical Configuration of the Printer]

Figure 7:
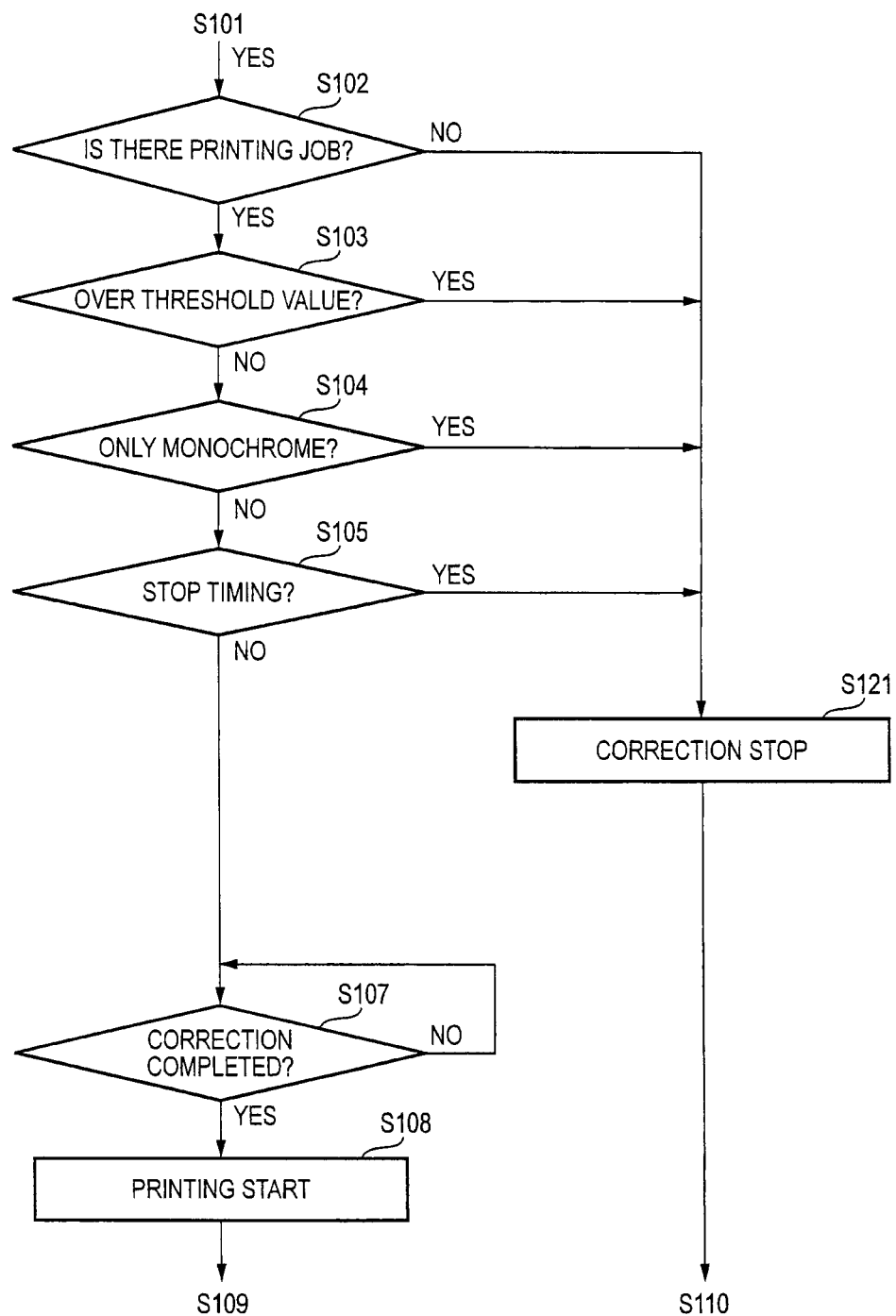
FIG. 7 is a flowchart illustrating the order of a power saving mode change process according to a second aspect.

Next, the electrical configuration of the printer 100 will be described. The printer 100 of this form, as shown in FIG. 7, includes an image forming unit 10, an operation panel 40, a power supply control unit 20 (an example of an execution unit) controlling power supply to various kinds of components, a control unit 30 controlling the image forming unit 10, a USB interface 35 that is a communication interface for connecting to an external device, and a network interface 36. On the other hand, a power switch 25 is included in the power supply control unit 20.

The control unit 30 includes a CPU 31, a ROM 32, a RAM 33, and a nonvolatile RAM (NVRAM) 34. In the ROM 32, firmware that is a control program for controlling the printer 100, various settings, and initial values are stored. The RAM 33 is used as a work area in which various control programs are loaded or a storage area where image data is temporarily stored.

The CPU 31 (example of a processor that functions as the correction unit and the control unit) controls the respective components of the printer 100 while storing the processing result in the RAM 33 or NVRAM 34 in accordance with the control program read from the ROM 32 (example of memory) or signals sent from the various sensors.

The USB interface 35 is an interface that enables communication with another device. If a USB memory is connected to the USB interface 35, the printer 100 reads and outputs image data that is stored in the USB memory. A connection destination of the USB interface 35 is not limited to the USB memory, but may be, for example, a personal computer (PC).

In the same manner as the USB interface 35, the network interface 36 is an interface that enables communication with another device. In the same manner as the USB interface 35, the printer 100 may receive and output the image data from the external device that is connected through the network interface 36.

On the other hand, the connection between the printer 100 and the external device is not limited to a form in which the USB interface 35 or the network interface 36 is interposed between them. For example, if the printer 100 has a wireless communication interface, the printer 100 may perform data communication with the external device through wireless communication. Further, if the printer 100 has a FAX interface, the printer 100 can perform data communication through telephone lines.

The image forming unit 10 includes components that print an image on the sheet, and includes the above-described processing unit 50, the fixing device 8, and various rollers that convey the sheet. The image forming unit 10 also includes the driving motor 79 that drives various rollers.

[Power Supply Control]

Next, the power supply control of the printer 100 will be described. The printer 100 has a power saving mode in which power supply to at least the image forming unit 10 is limited to reduce power consumption and a power supply mode in which power is supplied to the whole power system. In the power supply mode, the power is supplied to the image forming unit 10, the control unit 30, the operation panel 40, the external interface, and the power switch 25, and the printing operation can be performed. Just after the start of the printer 100, the printer 100 operates in the power supply mode.

If the condition for changing to the power saving mode is met while the printer is being operated in the power supply mode, the printer changes to the power saving mode. In the power saving mode, the power supply to the image forming unit 10, the control unit 30, the operation panel 40, and the external interface is interrupted. As a result, the printing operation cannot be performed, and the power consumption is lower than the power supply mode. The changing of the power supply to the various components is performed by the power supply control unit 20. Even in the power saving mode, the power supply to the power supply control unit 20 continues. The power supply control unit 20 has a sensor for detecting an on/off state of the power switch 25, and even in the power saving mode, the power supply control unit 20 accepts a user's operation of the power switch 25. If the power switch 25 is pressed while the printer is being operated in the power saving mode, the printer resume the power supply to all components including the control unit 30, and changes to the power supply mode.

In the printer 100, three change conditions for the printer 100 to change from the power supply mode to the power saving mode are pressing of the power switch 25, reception of a change command from an external device such as a PC, and reception of a timer event that issues at a time that is set as a change time. If even one of them is met, the printer changes from the power supply mode to the power saving mode. In the power saving mode, the power is not supplied to the external interface or the operation panel 40, and only the pressing of the power switch 25 becomes the change condition for the printer 100 to change from the power saving mode to the power supply mode.

[Power Saving Mode Change Process]

[First Aspect]

Figure 5:
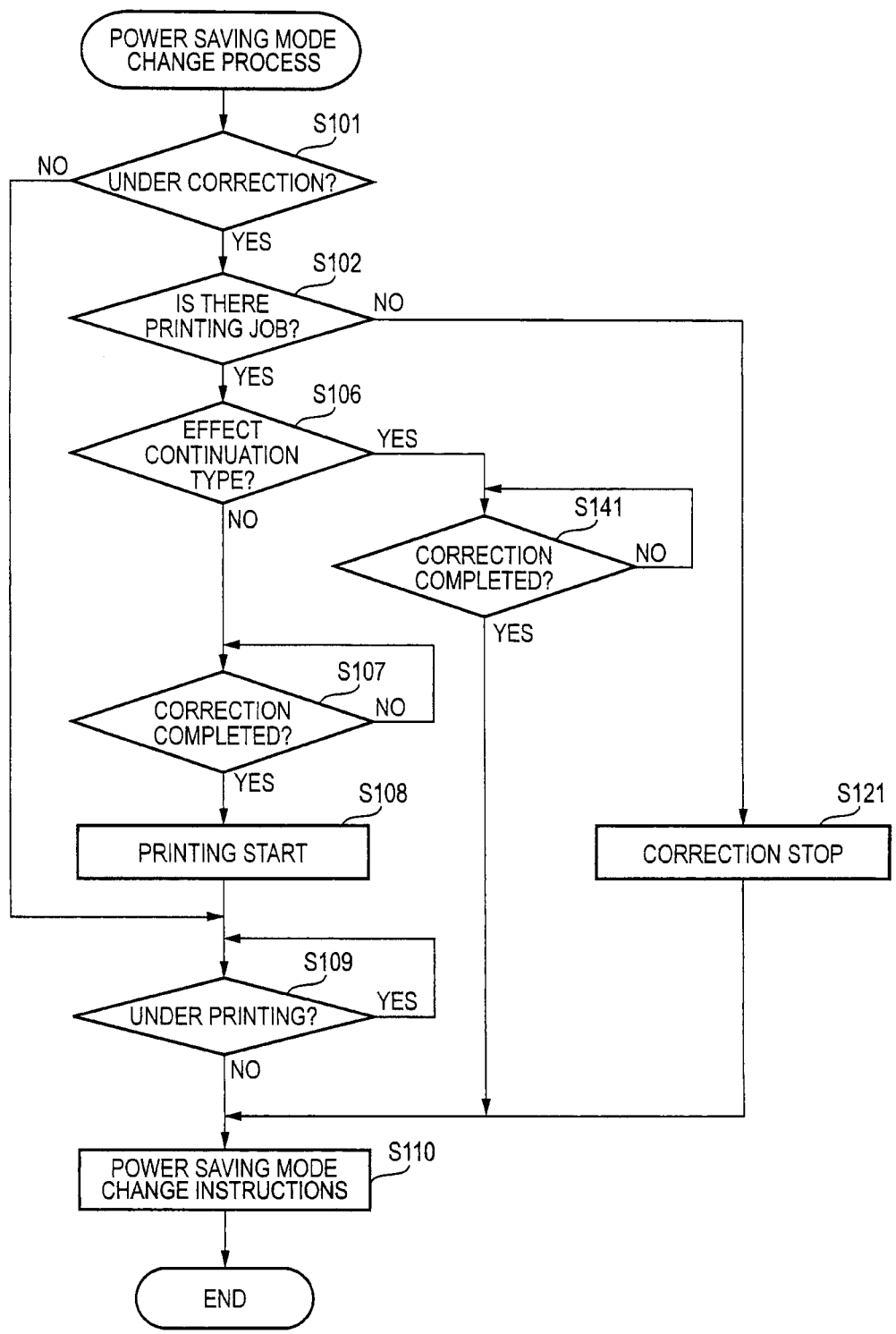
FIG. 5 is a flowchart illustrating the order of a power saving mode change process according to a first aspect.

Next, a power saving mode change process, which realizes the change operation to the power saving mode, will be described with reference to the flowchart of FIG. 5. The power saving mode change process is executed by the CPU 31 in case that the change condition to the power saving mode is met during executing the operation in the power supply mode.

According to the power saving mode change process, it is first determined whether the image forming unit 10 is executing the correction process (S101). If the image forming unit 10 is not executing the correction process (NO in S101), the processing proceeds to S109 to determine whether the image forming unit 10 is performing printing. Processes after S109 will be described later.

If the image forming unit 10 is executing the correction process (YES in S101), it is determined whether there is a print being in a waiting state (S102). If there is no waiting print job (NO in S102), the correction process being executed may be wasted, and thus the correction process being executed is stopped (S121). After S121, change instructions to the power saving mode are output (S110) without performing the printing, and the power saving mode change process is terminated. The power supply control unit 20, if the change instructions to the power saving mode are received, interrupts the power supply to the image forming unit 10, the control unit 30, the operation panel 40, and the external interface.

Incidentally, the embodiment where the correction process is stopped in S121 may be a embodiment where the correction process being executed is completed and then the following correction process is stopped, or a embodiment where the correction process being executed is stopped. In the former case, for example, in case that the execution condition of the plurality of correction processes are respectively satisfied at the same time and it is necessary to execute the plurality of correction processes in certain execution timing, a series of correction processes are executed in the above-described priority order. In this case, the correction process being executed is completed, and the other correction processes are stopped. Since it is necessary to form marks with toner on the belt 7 and collect the toner from the belt 7 in the correction process, stopping of the correction process in an embodiment where the toner are not collected from belt 7 may exert a bad influence on the printing. Accordingly, in order to avoid the influence on the picture quality, it is preferable to complete the correction process being executed. On the other hand, in the latter case, the correction process being executed is stopped midway, and thus the change to the power saving mode can be performed more promptly.

If there is a waiting print job (YES in S102), the correction process is not stopped, and it is determined whether the correction process being executed is an effect continuation type correction process in which the reliability of the correction value obtained by the correction process is maintained even if the printer 100 changes to the power saving mode (S106).

Whether the correction process is an effect continuation type correction process may be determined by the execution condition of the correction process. For example, in case that the execution condition of the correction process is that the value based on the print amount, such as the number of printed sheets or the number of revolutions of the developing roller, is equal to or larger than the threshold value, and the execution condition has not change even through the power saving mode. Accordingly, the reliability of the correction value is not deteriorated, and the correction value may be continuously used even after the printer returns to the power supply mode. Accordingly, it is determined that the correction process is an effect continuation type correction process.

On the other hand, in case that the execution condition of the correction process is that the value based on the environment variable (temperature or humidity) is equal to or larger than the threshold value, if the printer passes through the power saving mode, it is assumed that the environment in the device is greatly changed between before changing to the power saving mode and after returning to the power supply mode. Accordingly, even if the optimum correction value is acquired in the environment just before changing to the power saving mode, the optimum correction value may not be maintained in the environment after returning to the power supply mode, and thus the reliability of the correction value is deteriorated. Accordingly, it is determined that the correction process is an effect non-continuation type correction process. The effect non-continuation type correction process is executed once again as needed when returning to the power supply mode or before the initial printing after the returning.

According to the effect continuation type correction process, the correction value can be used even after the printer passes through the power saving mode as described above. Accordingly, it is preferable to complete the correction process. By completing the correction process, it is not necessary to execute the correction process after returning to the power supply mode, and thus an early start of the printing can be expected. Accordingly, in case that the correction process being executed is the effect continuation type (YES in S106), the printer 100 completes the correction process (S141), and after completing the correction process (YES in S141), change instructions to the power saving mode are output to the power supply control unit 20 (S110). After S110, the power saving mode change process is terminated.

On the other hand, if the correction process being executed is the effect non-continuation type (NO in S106), the reliability of the correction value is not continued, and thus the correction process may be wasted. Accordingly, the printer 100 completes the correction process (S107). After the correction process is completed (YES in S107), the printing starts (S108), and then the print jobs in a waiting state are successively executed. During the printing, the correction value of the correction process that has just been executed is used. As a result, the correction process that has just been executed is not wasted.

If the correction process is not being executed (NO in S101) or after S108, it is determined whether the printing is being performed by the image forming unit 10 (S109). In S109, it is determined that the printing is being performed until the printing of all pages of the print job is completed. In case that the printing is being performed (YES in S109), the completion of the printing is waited for. If the printing is not being performed (NO in S109), the change instructions to the power saving mode are output (S110), and then the power saving mode change process is terminated.

According to this aspect, if the correction process being executed is the effect continuation type (YES in S106), the printer 100 completes the correction process, and then changes to the power saving mode promptly. However, the determination in S106 may not be necessary. That is, regardless of the kind of the correction process, the correction process is stopped if there is no waiting print job, whereas the printing may start after completing the correction process if there is the waiting print job. If there is the waiting print job (YES in S102), the processing may proceed to S107.

According to this aspect, if there is the waiting print job (YES in S102), in order to avoid the waste of the correction process, the print job is executed in S108 after completing the correction process. However, the printer 100 may notifies the user and asks the user to instruct whether to execute the print job.

For example, if there is the print job (YES in S102), a print execution job selection screen is displayed on the display unit 41 as shown in FIG. 6. In the print execution job selection screen, when the change condition to the power saving mode is met, a list of print jobs registered in a job queue is displayed, and then it is possible to select whether to execute the print jobs. After receiving the user's selection, the processing proceeds to S107 to wait for the completion of the correction process.

The selected print job is executed, and but the unselected print jobs are not executed. As a result, the change control that is more suitable for the circumstances of the user can be realized.

Further, with respect to the target correction process to be stopped by the power saving mode change process according to an illustrative embodiment, the printer returns to the power supply mode and executes the correction process in case that the execution condition is met. The execution timing of this correction process may be just after the returning or before the initial printing is performed after the returning.

[Second Aspect]

Next, a power saving mode change process according to another form will be described with reference to the flowchart of FIG. 7. According to the second aspect, even if there is a print job to be executed after the correction process, the printer 100 stops the correction process and changes to the power saving mode promptly while a certain condition is met. This point is different from that according to the first aspect.

The second aspect is different from the first aspect on the following processes in case that there is the print job (YES in S102), and the other processes are the same as those according to the first aspect. Accordingly, the following processes in case that there is the print job (YES in S102) will be described, and the explanation of the other processes will be omitted.

In the power saving mode change process according to the second aspect, if there is the print job (YES in S102), it is determined whether the remaining amount of toner is equal to or larger than a threshold value (S103). The remaining amount of toner may be the remaining amount of a color having the smallest amount among four color toners of the processing unit 50, or may be the remaining amount of the sum of the four color toners. Further, the remaining amount of toner may be directly detected by an optical sensor arranged to detect whether the amount of toner in the toner cartridge is equal to or larger than the threshold value, or may be indirectly calculated from the number of revolutions of the developing roller or a dot counter.

If the remaining amount of toner is equal to or larger than the threshold value (YES in S103), for example, if the four color toners are almost new, the waste of some toners is allowed. That is, the waste of the correction process is allowed. Accordingly, early changing to the power saving mode is preferentially performed, and the correction process being executed is stopped (S121).

If the remaining amount of toner is smaller than the threshold value (NO in S103), it is determined whether the print jobs in the waiting state are all monochrome print jobs (S104). If the print jobs are monochrome print jobs, balance between K and the other colors does not matter, and the monochrome printing has a small benefit due to the correction process in comparison to the color printing. Accordingly, in the case of the monochrome printing only (YES in S104), the processing proceeds to S121 to stop the correction process, and the changing to the power saving mode is hastened.

Figure 8:
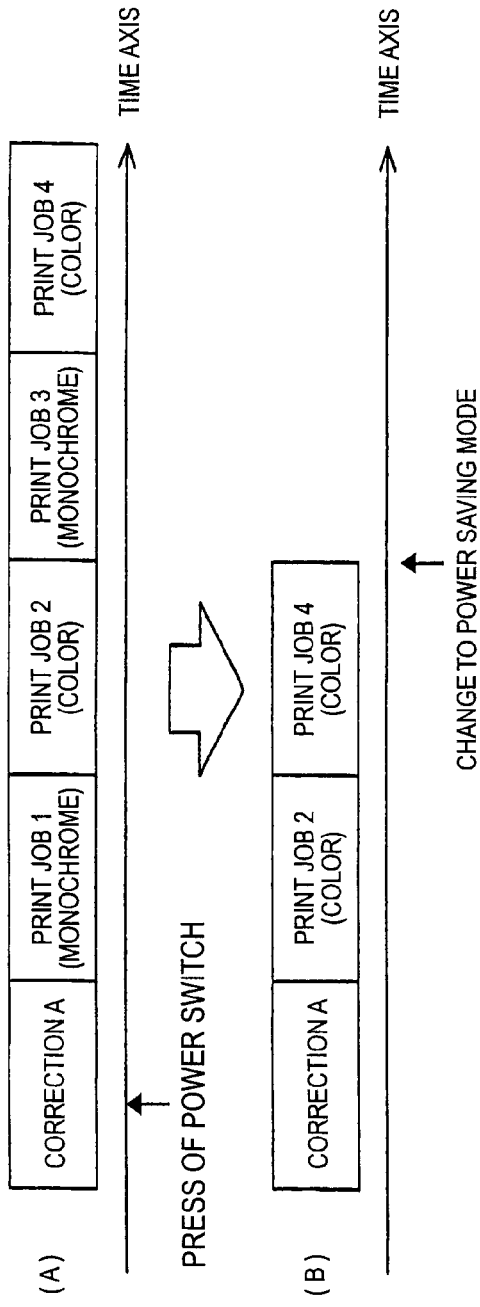
FIG. 8 is a diagram illustrating the concept of continuing printing through extraction of a color print job.

Further, if there is a plurality of waiting print jobs and the color print job and the monochrome print job are mixed, print target jobs may be all the plurality of print jobs, or the color print jobs only by canceling the monochrome print jobs. In the former case, the waste of the correction process is avoided more surely, and in the latter case, it is expected to hasten the changing to the power saving mode with avoiding the waste of the correction process. Additionally, in the latter case, for example, as shown in FIG. 8, when pressing of the power switch 25 is detected during executing the correction process A and print jobs are registered in the job queue in the order of monochrome print job 1, color print job 2, monochrome print job 3, and color print job 4, the print job 1 and the print job 3 are cancelled, and the changing to the power saving mode is performed after completing the print job 4.

If a color print job is included in the waiting print jobs (NO in S104), it is determined whether it is a stop timing not to continue the correction process (S105). If the execution condition of the plurality of correction processes are respectively met/satisfied at the same time and it is necessary to perform the plurality of correction processes in certain timing, the printer 100 performs a series of correction processes in accordance with the above-described priority order. In the case of performing the series of correction processes, the series of the correction processes do not be completed until the last correction process is completed. On the other hand, it may be considerably delayed if the printer 100 change to the power saving mode until all the correction processes are completed. Accordingly, the stop timing not to continue the correction process is prescribed. If the stop timing is determined (YES in S105), the processing proceeds to S121 to stop the correction process, and the changing to the power saving mode is hastened.

Figure 9:
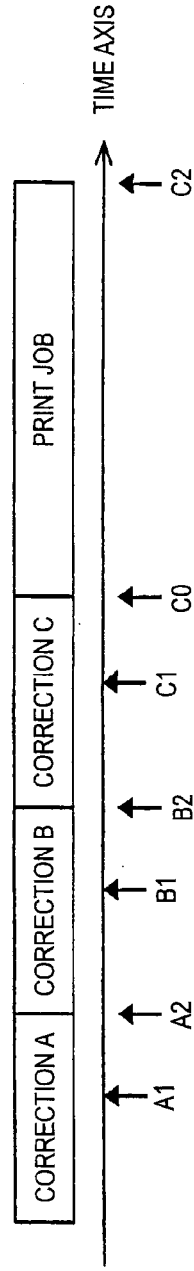
FIG. 9 is a diagram illustrating power switch pressing timing and power saving mode change timing.

For example, as a series of correction processes, it is assumed that a correction process A, a correction process B, and a correction process C are to be performed as shown in FIG. 9, and the print jobs are registered in the job queue. The correction processes A, B, and C respectively correspond to sub-correction processes. In this case, the correction value as the series of correction processes is not obtained until the last correction process C is performed. Accordingly, when pressing of the power switch 25 is detected during executing the last correction process C, the correction value is obtained after completing the correction process C, and thus the following print job can be executed. On the other hand, when pressing of the power switch 25 is detected during executing of the correction process A or the correction process B, the series of the correction processes can be stopped after completing the correction process A or the correction process B, but the final correction value is not obtained. In this case, since the changing to the power saving mode may be delayed if the printer 100 change to the power saving mode until the remaining correction processes are completed, and thus the timing in which the correction process A or the correction process B is being performed becomes the stop timing.

In this case, if pressing of the power switch 25 is detected at A1 when the correction process A is being performed, after the correction process A is completed, the changing to the power saving mode is performed at A2 that is just after completing the correction process A, without performing the correction process B, the correction process C and the printing. Further, if pressing of the power switch 25 is detected at B1 when the correction process B is being performed, after the correction process B is completed, the changing to the power saving mode is performed at B2 that is just after completing the correction process B, without performing the correction process C and the printing,. On the other hand, if pressing of the power switch 25 is detected at C1 when the correction process C is being performed, the series of correction processes are all completed including the completion of the correction process C. Accordingly, the changing to the power saving mode is performed at C2 that is just after completing the print job after completing the print job rather than the changing to the power saving mode is performed at C0 that is just after completing the correction process C.

That is, the execution period of the correction processes except for the last correction process is set to the stop timing, and in case that the change condition to the power saving mode is met when the series of the correction processes are performed and there is a print job to be executed after completing the series of the correction processes, it is determined whether the execution period is the stop timing. If it is not the stop timing, the print job is executed after completing the last correction process, and thereafter, the changing to the power saving mode is performed. On the other hand, if it is the stop timing, the series of the correction processes are stopped midway, the print job is canceled, and then the changing to the power saving mode is performed. That is, only in the case of the last correction process, the series of the correction processes are completed. Accordingly, the waiting of the completion of the correction process is minimized, and the delay of the changing to the power saving mode can be suppressed.

On the other hand, the timing in which the number of unexecuted correction processes of the series of the correction processes becomes equal to or larger than the number of additions of the correction processes, of which the execution is completed and the correction processes being executed, may be the stop timing. That is, in case that the series of correction processes are performed when the change condition to the power saving mode is met and there is the print job to be executed after completing the series of the correction processes, if the number of unexecuted correction processes among the series of correction processes is smaller than the number of additions of the correction processes, of which the execution is completed and the correction processes being executed, the print job is executed after completing the series of the correction processes, and then the changing to the power saving mode is performed. Accordingly, the waste of the series of the correction processes can be avoided. On the other hand, if the number of unexecuted correction processes is not smaller than the number of additions, the series of correction processes are stopped, the print job is cancelled, and then the changing to the power saving mode is performed. As a result, the changing to the power saving mode can be promptly performed.

In case that the timing is not the stop timing (NO in S105), the completion of the correction process is waited for (S107), and the printing starts (S108). As a result, in case that any one of S103, S104, and S105 is met, the correction process is stopped even if there is the print job, and the changing to the power saving mode can be promptly performed without performing the printing.

Incidentally, all of the determinations of S103, S104, and S105 may not be performed. That is, only one of S103, S104, and S105 may be determined or two of them may be determined. Further, the order of determinations is not fixed. Further, the determination of whether the correction process is the effect continuation type correction process in S106 according to the first aspect may be combined with this aspect. In this case, for example, if the timing is not the stop timing (NO in S105), the determination in S107 may be performed thereafter.

As described above, in case that the change condition from the power supply mode to the power saving mode is met when the correction process is performed and there is the print job to be executed after completing the correction process, the printer 100 according to this aspect completes the correction process and the print job that is executed thereafter before changing to the power saving mode. Accordingly, the result of the correction process can be used for the printing, and thus the correction process is not wasted. As a result, it can be expected to reduce the wasted correction process.

The illustrative embodiment as described above is merely exemplary, and this disclosure is not limited thereto. Accordingly, various corrections and modifications are possible within the range that does not depart from the scope of this disclosure. For example, the printer is not limited to a printer, and may be any one of a copy machine, a fax device, and a multifunction peripheral, which has the printing function. Further, the printing type is not limited to the electrophotographic type, but may be an ink jet type. Further, the printer is not limited to a color printer, but may be a printer for exclusive use of the monochrome.

In the illustrative embodiment, as the modes indicating the power supply state, two modes including the power supply mode and the power saving mode are provided. However, three or more modes may be provided. For example, the power supply mode (mode in which power is supplied to all the power system) is set as a ready mode, and between the ready mode and the power saving mode, a sleep mode may be provided, in which the power supply to the image forming unit 10 is interrupted, but the power supply to the control unit 30 or the interface continues.

Further, in the illustrative embodiment, the process to wait for that the printing of all pages of the print job is completed in the case of the printing rather than the correction processing when the change condition to the power saving mode is met, and the process to wait for the completion of the print job that starts after completing the correction process is common. However, even in the middle of the print job, the print job may be canceled without waiting for the completion of the print job. In other words, priority may be given to the changing to the power saving mode rather than completion of the print job.

Further, in the illustrative embodiment, whether the waste of toner is allowed is determined through determination of whether the remaining amount of toner is equal to or smaller than the threshold value in S103, but the allowance determination is not limited thereto. For example, setting of a toner save mode may suppose that the life of the toner is near. Accordingly, if the toner save mode is set in the print job, it may be determined that the waste of toner is not allowed, and if the toner save mode is not set, it may be determined that the waste of toner is allowed.

Further, in the illustrative embodiment, whether the waste of toner is allowed is determined through determination of whether the remaining amount of toner is equal to or smaller than the threshold value in S103, but the consumable goods are not limited to the toner. Consumable goods are corresponding to, for example, coloring agents, developing rollers, photosensitive conductors, and belts. The remaining use amount of consumable goods are corresponding to, for example, the remaining amount of coloring agents in view of the coloring agents, and the remaining number of revolutions in view of rotating bodies, such as the developing rollers. For example, whether the waste of consumable goods is allowed may be determined through determination of whether the number of revolutions of the developing roller, the photosensitive conductor, or the conveyance belt 7 is equal to or smaller than the threshold value.

Further, in the illustrative embodiment, in case that the change condition to the power saving mode is met during the correction process and there is the print job to be executed after completing the correction process, the printer completes the correction process and the print job to be executed thereafter before changing to the power saving mode. However, in case that the change condition to the power saving mode is met and there is the print job received before the correction process is completed, the printer may complete the printing and then perform changing to the power saving mode.

The processes disclosed in the illustrative embodiment may be executed by a single CPU, a plurality of CPUs, hardware of ASIC, or a combination thereof. Further, the processes disclosed in the illustrative embodiment may be realized in various aspects, such as a recording medium recorded with a program or a method for executing the processes.

What is claimed is:

1. A printer comprising:
    a print unit configured to form an image on a sheet;
    a processor; and
    memory storing computer readable instructions that, when executed by the processor, cause the printer to:
    operate the printing unit in an operation mode, which is one of a power supply mode and a power saving mode, wherein power consumption in the power saving mode is less than power consumption in the power supply mode;
    execute a correction process to acquire a correction value;
    adjust printing characteristics of the print unit in accordance with the acquired correction value;
    in case that a particular condition is satisfied while the correction process is performed, determine whether there is a print job to be executed in accordance with the adjusted printing characteristics after completing the correction process; and
    change the operation mode from the power supply mode to the power saving mode after completing the correction process and executing the print job when determined that there is the print job to be executed in accordance with the adjusted printing characteristics after completing the correction process.

2. The printer according to claim 1,
    wherein the computer readable instructions further cause the printer to:
    change the operation mode from the power supply mode to the power saving mode after stopping the correction process when determined that there is no print job to be executed in accordance with the adjusted printing characteristics after completing the correction process.

3. The printer according to claim 1,
    wherein the computer readable instructions further cause the printer to:
    in case that the particular condition is satisfied while the correction process is performed and there is a print job to be executed in accordance with the adjusted printing characteristics after completing the correction process, determine whether the print job is a color print job or a monochrome print job;
    change the operation mode from the power supply mode to the power saving mode after completing the correction process and executing the color print job when determined that the print job is the color print job; and
    change the operation mode from the power supply mode to the power saving mode after stopping the correction process when determined that the print job is the monochrome print job.

4. The printer according to claim 1,
    wherein the computer readable instructions further cause the printer to:
    in case that the particular condition is satisfied while the correction process is performed and there are a plurality of print jobs to be executed in accordance with the adjusted printing characteristics after completing the correction process, determine whether there is at least one color print job in the plurality of print jobs;
    change the operation mode from the power supply mode to the power saving mode after completing the correction process and executing the at least one color print job when determined that there is at least one color print job in the plurality of print jobs; and
    change the operation mode from the power supply mode to the power saving mode after stopping the correction process when determined that there is no color print job in the plurality of print jobs.

5. The printer according to claim 1,
    wherein the computer readable instructions further cause the printer to:
    in case that the particular condition is satisfied while the correction process is performed and there is a print job to be executed in accordance with the adjusted printing characteristics after completing the correction process, determine whether a remaining amount of consumables is less than a particular amount;
    change the operation mode from the power supply mode to the power saving mode after completing the correction process and executing the print job when determined that the remaining amount of the consumables is less than the particular amount; and
    change the operation mode from the power supply mode to the power saving mode after stopping the correction process when determined that the remaining amount of the consumables is equal to or greater than the particular amount.

6. The printer according to claim 1,
    wherein the correction process includes at least two sub-correction processes for acquiring different correction values, and
    wherein the computer readable instructions further cause the printer to:
    in case that the particular condition is satisfied while the sub-correction process is performed and there is a print job to be executed in accordance with the adjusted printing characteristics after completing the last sub-correction process among the at least two sub-correction processes, determine whether a number of unexecuted sub-correction processes among the at least two sub-correction processes is less than addition of the completed sub-correction processes and the sub-correction processes under executing;
    change the operation mode from the power supply mode to the power saving mode after completing the last sub-correction process and executing the print job when determined that the number of the unexecuted sub-correction processes is less than the addition; and
    change the operation mode from the power supply mode to the power saving mode after stopping the correction process when determined that the number of the unexecuted sub-correction processes is equal to or greater than the addition.

7. The printer according to claim 1,
wherein the correction process includes at least two sub-correction processes for acquiring different correction values, and
wherein the computer readable instructions further cause the printer to:
in case that the particular condition is satisfied while the sub-correction process is performed and there is a print job to be executed in accordance with the adjusted printing characteristics after completing the last sub-correction process among the at least two sub-correction processes, determine whether the last sub-correction process is currently executed,
change the operation mode from the power supply mode to the power saving mode after completing the last sub-correction process and executing the print job when determined that the last sub-correction process is currently executed; and
change the operation mode from the power supply mode to the power saving mode after stopping the correction process when determined that the last sub-correction process is not currently executed.

8. The printer according to claim 1,
wherein the computer readable instructions further cause the printer to:
in case that the particular condition is satisfied while the correction process is performed, determine whether a correction condition of the correction process changes while the printer operates the printing unit in the power saving mode;
change the operation mode from the power supply mode to the power saving mode after completing the correction process and executing the print job when determined that the correction condition of the correction process changes; and
change the operation mode from the power supply mode to the power saving mode after completing the correction process when determined the correction condition of the correction process does not change.

9. The printer according to claim 1,
wherein the computer readable instructions further cause the printer to:
in case that the particular condition is satisfied while the correction process is performed and there is a print job to be executed in accordance with the adjusted printing characteristics after completing the correction process, receive a user's selection of whether to execute the print job;
change the operating mode from the power supply mode to the power saving mode after completing the correction process and executing the print job in response to receipt of the user's selection of executing the print job; and
change the operating mode from the power supply mode to the power saving mode after stopping the correction process when the user's selection of executing the print job is not received.

10. A printer comprising:
a print unit configured to form an image on a sheet;
a first control device configured to:
    supply a first amount of power to respective components of the printer in a power supply mode;
    supply a second amount of power to respective components of the printer in a power saving mode, the second amount of power being less than the first amount of power; and
    change from the power saving mode to the power supply mode when a power switch is operated; and
a second control device configured to:
    execute a correction process to acquire a correction value;
    in case that a particular condition is satisfied while the correction process is performed, determine whether there is a print job to be executed in accordance with the adjusted printing characteristics after completing the correction process; and
    change the operation mode from the power supply mode to the power saving mode after completing the correction process and executing the print job when determined that there is the print job to be executed in accordance with the adjusted printing characteristics after completing the correction process.

* * * * *